INVENTORS
WAYNE M. FASSELL, JR.
DONALD W. BRIDGES
BY MINOR H. WHITE

ATTORNEY

United States Patent Office 3,507,700
Patented Apr. 21, 1970

3,507,700
METHOD OF OPERATING A THERMAL FUEL CELL COMPRISING A METAL AND A HALOGEN ELECTRODE
Wayne Martin Fassell, Jr., and Donald W. Bridges, Newport Beach, and Minor H. White, Costa Mesa, Calif., assignors to Philco-Ford Corporation, a corporation of Delaware
Filed Jan. 4, 1966, Ser. No. 518,573
Int. Cl. H01m *15/02*
U.S. Cl. 136—86     1 Claim

ABSTRACT OF THE DISCLOSURE

A method for electrochemically generating electricity in a fuel cell, including reacting a halogen gas with a metal through the intermediation of a molten electrolytic medium to produce a reaction product insoluble in said medium, and operating said fuel cell at a temperature sufficiently high to volatilize, but insufficient to decompose, said reaction product.

---

Figure 1:
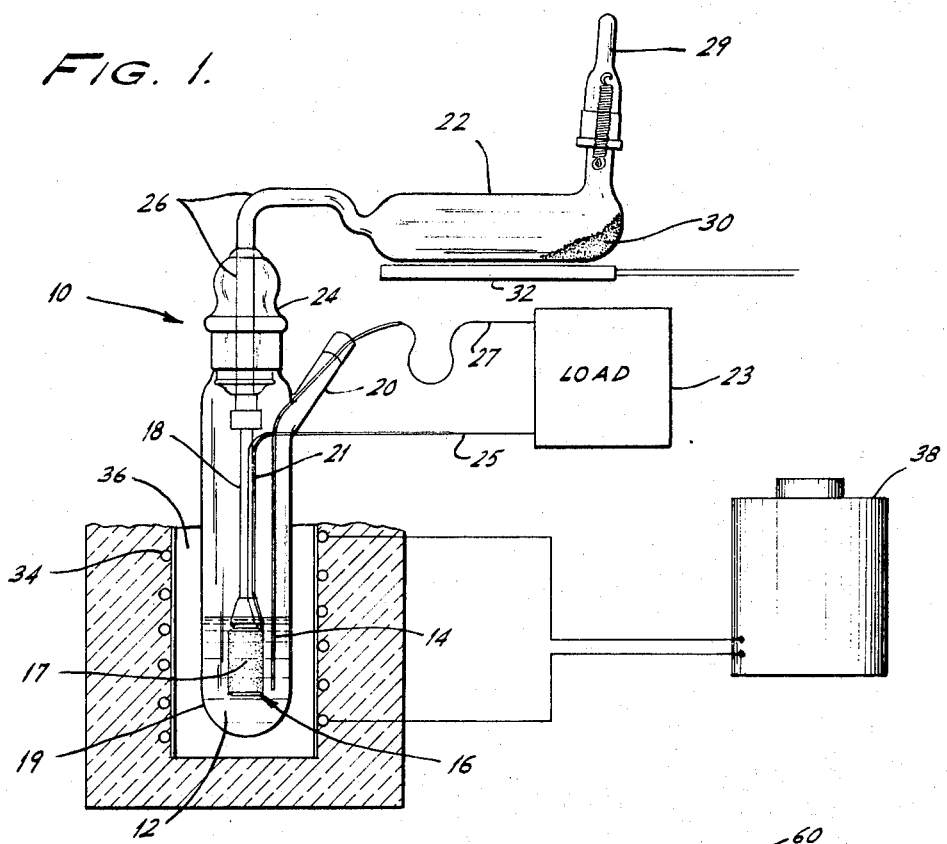

This invention relates to energy-converting means and more particularly to a novel method of and electrochemical means for generating electricity utilizing halogen gas as a reactant fuel.

A present method of obtaining electrical energy is first to convert the energy of a given fuel into heat by combustion. The heat is then converted by one of several kinds of heat engines into mechanical energy which in turn is converted into electricity. In such a process the chemical energy associated with the oxidation of the fuel is degraded into heat before it is utilized and therefore the efficiency of energy conversion is necessarily restricted by the second law of thermodynamics.

In electrochemical generation of electricity chemical energy is converted directly into electricity thereby avoiding restrictions imposed by Carnot cycle efficiencies. In addition to the high operating efficiencies achievable using electrochemical energy conversion such conversion also presents the advantages of high energy output per unit weight and per unit volume, as well as affording clean, quiet operation.

Electrochemical devices are generally classifiable as either fuel cells or batteries. Normally in a fuel cell both fuel and oxidant are added from external sources to react at two separate essentially invariant electrodes. In a primary battery the two separate electrodes themselves are the fuel and oxidant and are consumed in the battery reaction. Since the energy-converting means comprising this invention is a hybrid device combining characteristics of both a fuel cell and primary battery, it is referred to herein as either a fuel cell or a battery. Because of its high temperature operating characteristics it has been designated a thermal cell or battery.

Although fuel cells have the advantages noted above they normally require complex control means for achieving the efficient operation of which they are capable. Moreover, many fuel cells in the normal process of operation are self-contaminating, and for continued and efficient operation require means both for replenishing or regenerating the electrolyte of the system and for avoiding various polarizing effects, caused for example by the interaction of reaction products with components of the system.

Accordingly, it is a general object of the present invention to provide energy converting means which overcome the limitations and deficiencies of the prior art.

Another object of the present invention is the provision of a fuel cell which is simple in construction, reliable in operation and which requires no associated electrolyte-regeneration system or depolarizing means.

It is a further and more particular object of the invention to provide a system for electrochemical generation of power which is not self contaminating and whose output power can be modulated readily and conveniently during discharge. It is also desirable that the system be capable of being energized and deenergized simply and quickly.

A still further object of the invention is the provision of a fuel cell having substantially unlimited shelf life and one which is capable of substantially instantaneous operation at high discharge rates over a substantial period of time.

Still another object of the invention is the provisions of a compact thermal reserve battery of minimal size comprised of a plurality of such fuel cells.

Figure 2:
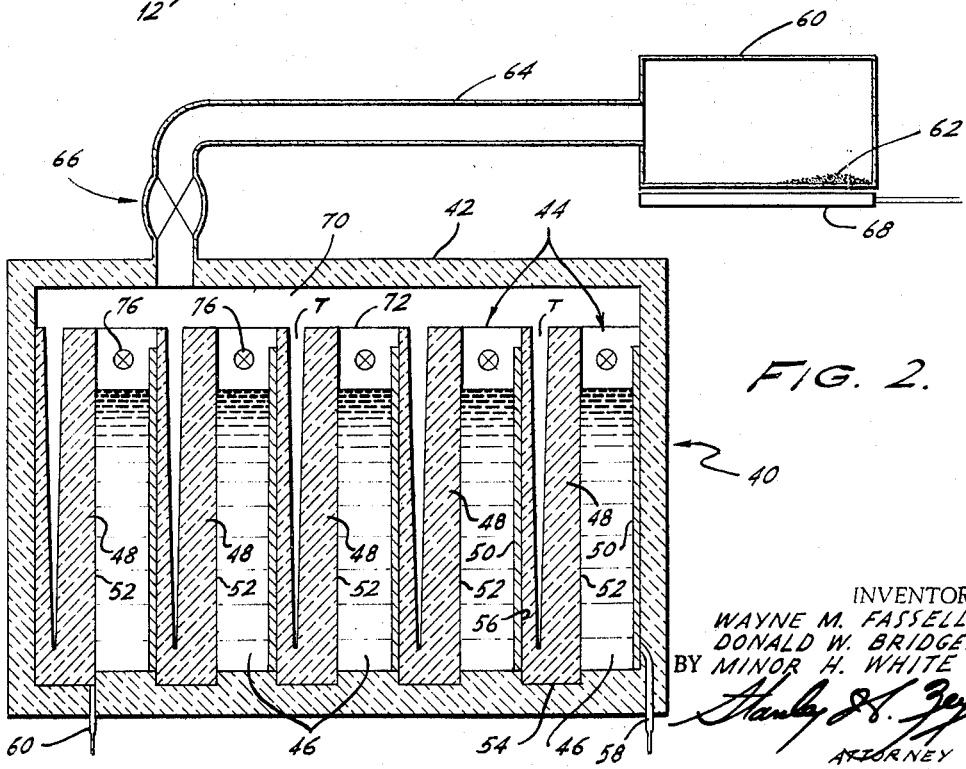

These and other objects will be more readily understood by reference to the accompanying detailed description and drawings, in which:

FIGURE 1 is a schematic showing of a single cell embodiment of the invention; and FIGURE 2 is a sectionalized elevational view of a multi-cell iodine-zirconium battery embodying the invention.

The invention briefly described relates to a high temperature fuel cell wherein one of the reactant fuels is metal, desirably zirconium and the other is a halide, desirably iodine which is rendered gaseous upon being raised to a predetermined elevated temperature. The preferred electrolyte is a eutectic mixture of lithium chloride and potassium chloride. The metal electrode is immersed in the fused salt electrolyte while the other electrode comprises a porous non-reactive member through which the gaseous halide is diffused into the electrolyte. The gas and consumable metal electrode react as a result of migration of halide ions through the electrolyte to produce an electric current. In accordance with the method teaching of the invention the reactant fuels are so selected as to produce a reaction product which is volatile at the operating temperature of the fuel cell and insoluble in the electrolyte. These characteristics permit the unique construction of an energy converting system in which the composition of the electrolyte remains substantially uncontaminated throughout the operational life of the system and permits construction of a system which does not require auxiliary apparatus for electrolyte regeneration or the use of depolarizing agents.

In the preferred embodiment the reaction product is zirconium tetraiodide which is a gas at battery operating temperatures and has extremely low solubility in fused salt electrolytes. Consequently, if a system using such reactants is vented to the atmosphere, the gas reaction products can escape leaving the system unaffected. To maintain cell operation requires only that the electrolyte be maintained at its operating temperature and that the cell be supplied sufficient amounts of the reactant fuels. As noted a preferred composition of electrolyte for the iodine-zirconium system is a eutectic mixture of lithium chloride and potassium chloride. Mixtures other than eutectic may be used but require somewhat higher operating temperatures to condition the system for ionic transport. It is also possible to use other combinations of alkali and alkaline earth salts as the electrolyte. The porous nonreactive member of the system is preferably catalyzed with gold, or other suitable overlay, to facilitate ionization.

Referring to FIGURE 1 there is shown a single fuel cell system 10 which basically consists of a fusible salt electrolyte 12 within which is disposed a consumable metallic electrode 14 made of zirconium or other suitable anodic material, and a gas diffusion electrode 16 comprised of porous gold or other noble metal overlaid on a gas-permeable substrate. In the illustrated embodiment the substrate comprises surface portions of a fritted glass cylinder 17 of known type, having a 40–60 micron porosity and terminating a standard gas dispersion tube 18. The porous gold electrode with its electrical lead 21 is made by painting the porous termination 17 and surface portions of tube 18 with a gold resinate. The tube and termination are then fired to an elevated temperature of approximately 700° F. thermally to decompose the resinate leaving a porous, electrically-continuous deposit of gold. The use of a resinate solution provides a convenient and economic vehicle for producing a strongly adherent metallic film on glass, ceramics, quartz and other similar materials. Electrical connection between an external load 23 and the lead or strip 21 is made by conductor 25 which enters the container through an hermetically sealed aperture not shown.

The electrolyte 12 is housed within a container 19 made of glass, quartz or similar material, provided with a side arm 20 through which project upper portions of electrode 14. The electrode is connected in closed circuit with the load 23 by wire 27. As the anode is consumed during battery action it can be replaced by feeding additional portions thereof into the reaction zone. Since components of the system are nonreactive at room temperature and since the iodine crystals are storable as an inert solid, under normal conditions of temperature and pressure, the system has substantially unlimited shelf life and can be maintained as a reserve battery capable of energization simply by application of heat. A system using the reactants considered above has utility, for example, as a self-activating battery suitable for use in a Venus probe. The surface temperature of Venus is estimated to be about 800° F. The iodine would become gaseous, and the electrolyte salts fused, at the elevated temperature encountered on Venus and the battery would be self-activating when placed in such an environment. It will of course be appreciated that the physical arrangement shown in FIGURE 1 is in the nature of a laboratory setup and would be modified to meet space requirements.

Referring again to FIGURE 1 the container 19 is stoppered by a tapered, ground glass plug 24 and the retort 22 is sealed by the spring-loaded cap 29 to present a totally closed system. Plug 24 is traversed by tubing 26 hermetically sealed to the plug and interposed in fluid flow connection between the gas dispersion tube 18 and retort 22. To activate the system, use may be made of any suitable source supplying sufficient heat to the electrolyte to raise its temperature above the melting point and to cause sublimation of iodine crystals 30 contained within retort 22 such, for example, as by use of a pyrotechnic charge or other suitable heat generating means. In the illustrated embodiment resistive elements 32 and 34 are employed as the heat generating means. As previously noted cell activation can also be initiated by exposure of the cell to suitable environmental conditions such, for example, as exist on Venus. To facilitate maintenance of cell temperature utilizing the laboratory set shown in FIGURE 1 the container 18 may be disposed within an insulated well 36. To permit temperature variation, coils 34 encircling the well are energizable through a powerstat 38. By modulating the heat applied to the iodine crystals 30 the halogen vapor can be metered into the cell as needed. Regulation of the gas flow rate can also be achieved by use of conventional valving means, not shown, interposed in the flow line 26.

With the electrolyte heated to proper operating temperature the cell is activated substantially immediately upon application of heat to the iodine storage chamber.

In conventional electro-chemical symbolism, the cell reaction may be expressed as: $Me|MeX_n$ (in molten electrolyte) $X_2(g)$ (at atmospheric pressure on $A\mu$) where X represents the halogen atom and Me, the metal that forms a volatile halide $MeX_n$ at the cell temperature. At the cathode 17 of the battery, halogen molecules disassociate, absorb on, and accept electrons from the external circuit. The resulting halide ions dissolve into the electrolyte and migrate to the anode 14 comprised of the metal Me. At the anode the half cell reaction is: $Me = Me^{+n} + ne$, which is to say that the metal anode is dissolved, forming $Me^{+n}$ ions and releasing electrons to the external circuit. The metal ions thus formed react with halide ions to form volatile $MeX_n$. In chemical terms, anode materials are reducing agents which are characterized by the ease with which they give up electrons and are oxidized to a higher oxidation state; cathode materials on the other hand are oxidizing agents which are characterized by the ease with which they accept electrons and are reduced to a lower oxidation state. Electrical energy is derived from simultaneous oxidation of anode material and reduction of cathode material by electrochemical reaction. As a result of this reaction electrons are generated which flow from the anode electrode through the external circuit to the cathode. The specific reactions occurring in a zirconium-iodine cell are throught to proceed to follows:

Anode: $Zr \rightarrow Zr^{++++} + 4e$
Cathode: $I_2 + 2e \rightarrow 2I^-$

The overall energy producing reaction is $$2I_2 + Zr \rightarrow ZrI_4$$

With the zirconium and porous gold electrodes disposed in a LiCl-KCl eutectic melt maintained at a temperature lying in the range from 400° C.–460° C., and with iodine vapors permeating through the porous gold electrode, an open circuit voltage of approximately 1.25 volts can be developed. This open circuit voltage is not sustainable under load when working into a load of 680 ohms the cell voltage approaches about .25 volt, asymptotically. On removal of the load the normal open circuit voltage is restored. Experimentation discloses that the cells are capable of being repeatedly cycled through this operational sequence without any apparent deleterious effect. Each time the cell is placed under load the voltage decreases but recovers on removal of the load. It will be appreciated, however, that the above characteristics are only indicative of the general performance of the cell and vary as a function of design, pressure and other factors. Over the operating temperature range of the system the effect of temperature on voltage performance was found to be of minor significance. Although the cell shown in FIGURE 1 is unvented, no objectionable contamination of the electrolyte or impairment of operation of the cell attributable to the reaction product (zirconium tetraiodide) was observed. As previously noted the compound is substantially insoluble in the electrolyte and is non-reactive with components of the system.

To achieve higher operating voltages the cells may be serially arranged in the manner shown, for example, in FIGURE 2. As illustrated in that figure the multi-cell battery 40 comprises an enclosure 42, made of quartz, glass or other suitable material, housing a plurality of individual cell units 44. Each cell unit comprises a well of electrolyte 46 bounded on one side by a porous gold-plated ceramic electrode 48 and on an opposite side by a metal strip 50 composed of zirconium or other suitable metal. The electrodes are disposed on ceramic barriers extending across the battery case from wall to wall thereof. Each barrier has a V-shaped trough T therein. To facilitate series connection of individual cell units, surfaces 52, 54 and 56 of each of the ceramic electrode partitions 48 are gold coated, as by the method previously described. By use of this construction electrical interconnection between cells can be achieved without resort to external strapping or wiring.

The internal electrical circuit of the battery, beginning with the electrode connection 58 is from the zirconium plate 50 through the electrolyte 46 to the gold coated surface 52 and thence by way of the electrically conductive surfaces 54 and 56 to the zirconium plate 50 of the adjoining cell.

Auxiliary to the assemblage and in fluid flow communication with it is an iodine storage chamber 60 within which is disposed a charge of iodine crystals 62. A conduit 64 connects the storage chamber with the battery. To permit metered introduction of halogen gas into the battery adjustable valve means 66 are interposed in the line. When heat is supplied to the storage chamber 60, as by energization of the electric heating element 68, crystals of iodine sublime and iodine vapor enters the battery by way of manifold 70 which is in common communication with the troughs T of each of the individual cell units 44. The gas diffuses through the five porous gold-coated ceramic electrodes 48 to form a gas-electrolyte-electrode interfacial reaction zone along the electrode surfaces 52. The troughs T serve to achieve diffusion of halogen gas across substantially the entire submerged surface of the electrode 48. This construction maximizes the size of the reaction zone and provides the surface area necessary for short bursts of rapid, high-current-drainage operation. To prevent gas from entering the electrolyte compartments each of the cells is sealed off by means 72. The gas moving through the porous electrode is prevented from diffusing throughout the system by both the hydrostatic pressure exerted by the molten electrolyte upon the iodine vapor and the insolubility of the gas in the electrolyte. The capping of each cell and the confinement of the gas to the electrolyte-electrode interface insures against contamination of cell components by the highly reactive fuel gas and insures long battery life. To remove reaction products from the system the battery is vented to the atmosphere through the side wall thereof by means of valved passages indicated in the drawing at 76. As previously noted, in the preferred embodiment the iodine gas and zirconium metal react to produce zirconium tetraiodide which is both insoluble in the electrolyte and volatile thus insuring its escape from the system and consequent lack of electrolyte contamination. The gas was also observed to have no deleterious polarizing effects on battery action.

In summary applications have discovered a novel electrochemical system in which the preferred form comprises reaction a halogen gas such as iodine with a metal such as zirconium, through the intermediate of alkaline, charge-transporting media. By chosing fuels whose reaction products are both volatile and insoluble in the electrolytic media, an electrochemical system is achieved which is not self-contaminating and which is therefore capable of long operational life. Such systems have use, for example, as thermal reserve batteries and as both circuit and temperature sensitive activators.

While preferred forms of the present invention have been depicted and described, it will be understood by those skilled in the art that the invention is susceptible of detail changes and modifications without departing from the essential concepts thereof, and that such changes and modifications are contemplated as come within the scope of the appended claims.

We claim:

1. The method of electrochemically generating electricity in a fuel cell which comprises: reacting a halogen gas with a metal through the intermediation of a molten electrolytic medium, to produce a reaction product and electricity, operating said fuel cell at a temperature sufficient to volatilize but insufficient to decompose said reaction product, said reaction product being insoluble in said electrolytic medium.

References Cited

UNITED STATES PATENTS

| 3,031,518 | 4/1962 | Werner et al. | |
| 3,374,120 | 3/1968 | Lawson | 136—83 |

WINSTON A. DOUGLAS, Primary Examiner

H. A. FEELEY, Assistant Examiner

U.S. Cl. X.R.

136—83